United States Patent
Gavillet et al.

(10) Patent No.: US 9,044,116 B2
(45) Date of Patent: Jun. 2, 2015

(54) DRINK PREPARING MACHINE WITH HOLDING AND WARMING DEVICE

(75) Inventors: Gilles Gavillet, Ursy (CH); Peter Möri, Walperswil (CH); Jürgen Kristlbauer, Zollikofen (CH)

(73) Assignee: Nestec S.A., Vevey (CH)

( * ) Notice: Subject to any disclaimer, the term of this patent is extended or adjusted under 35 U.S.C. 154(b) by 1408 days.

(21) Appl. No.: 11/763,114

(22) Filed: Jun. 14, 2007

(65) Prior Publication Data
US 2007/0298953 A1  Dec. 27, 2007

(30) Foreign Application Priority Data
Jun. 15, 2006  (EP) .................................. 06115512

(51) Int. Cl.
| A23L 1/00 | (2006.01) |
| B67D 1/00 | (2006.01) |
| A47J 31/44 | (2006.01) |
| A47J 31/54 | (2006.01) |

(52) U.S. Cl.
CPC ............. *A47J 31/4435* (2013.01); *A47J 31/44* (2013.01); *A47J 31/54* (2013.01)

(58) Field of Classification Search
CPC ........ A47J 31/44; A47J 31/4435; A47J 31/54
USPC ....... 99/275, 288, 280, 279, 287, 289 R, 306, 99/307, 300, 303, 302 R, 310, 313, 293, 99/290, 294, 304; 219/443.1; 426/433
See application file for complete search history.

(56) References Cited

U.S. PATENT DOCUMENTS

| 2,916,599 | A | * | 12/1959 | Stiles | 219/436 |
| 3,060,906 | A | * | 10/1962 | Rawdon | 122/478 |
| 3,371,592 | A | * | 3/1968 | Remy et al. | 99/282 |
| 3,908,530 | A | * | 9/1975 | Simon et al. | 99/307 |
| 4,155,292 | A | * | 5/1979 | Rickert | 99/306 |
| 4,464,982 | A | * | 8/1984 | Leuschner et al. | 99/287 |
| 5,001,969 | A | * | 3/1991 | Moore et al. | 99/282 |
| 5,186,096 | A | * | 2/1993 | Willi | 99/282 |
| 5,237,911 | A | * | 8/1993 | Aebi | 99/287 |
| 5,367,607 | A | * | 11/1994 | Hufnagl et al. | 392/465 |
| 5,486,683 | A | * | 1/1996 | Shimizu et al. | 219/622 |
| 5,778,765 | A | * | 7/1998 | Klawuhn et al. | 99/290 |
| 5,842,407 | A | * | 12/1998 | Schmed | 99/290 |
| 6,019,028 | A | * | 2/2000 | Schmed | 99/293 |
| 6,227,102 | B1 | * | 5/2001 | Sham et al. | 99/286 |
| 6,326,585 | B1 | * | 12/2001 | Aleshin et al. | 219/121.63 |
| 6,568,077 | B1 | * | 5/2003 | Hellemann et al. | 29/889.1 |
| 6,575,702 | B2 | * | 6/2003 | Jackson et al. | 416/96 R |
| 6,908,288 | B2 | * | 6/2005 | Jackson et al. | 416/224 |

(Continued)

FOREIGN PATENT DOCUMENTS

| DE | 2952556 A | * | 7/1981 |
| DE | 41 39 804 C1 | | 5/1993 |

(Continued)

*Primary Examiner* — Brett Spurlock
(74) *Attorney, Agent, or Firm* — Winston & Strawn LLP

(57) ABSTRACT

A device and method for warming a cup in a machine for preparing a hot drink or beverage involving transmitting by conduction a part of the surface heat of the heating body to a cup holder. The heating body is also used to heat water in the machine. The device and method also at least partially dampen a vibration transmissible by the heating body to the surface of the cup holder.

16 Claims, 2 Drawing Sheets

(56) References Cited

U.S. PATENT DOCUMENTS

| | | | |
|---|---|---|---|
| 7,021,197 B2 * | 4/2006 | Chen et al. | 99/291 |
| 7,278,828 B2 * | 10/2007 | Steplewski et al. | 416/97 R |
| 7,882,639 B2 * | 2/2011 | Powers | 29/898.1 |
| 2003/0221564 A1 * | 12/2003 | Meineke et al. | 99/279 |
| 2005/0109816 A1 * | 5/2005 | Swartzbeck et al. | 228/44.3 |
| 2011/0005075 A1 * | 1/2011 | Trewiler et al. | 29/889.1 |

FOREIGN PATENT DOCUMENTS

| | | |
|---|---|---|
| DE | 19545111 A1 | 6/1997 |
| DE | 10351668 A1 * | 6/2005 |
| FR | 2 326 898 | 5/1977 |
| FR | 2 713 071 | 6/1995 |

\* cited by examiner

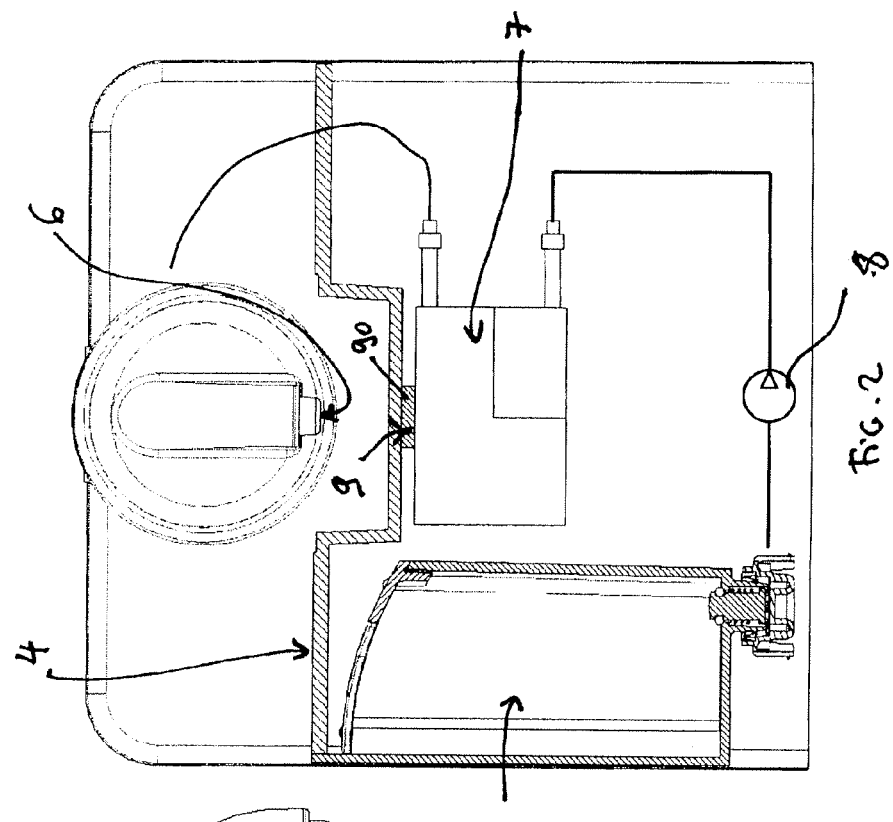
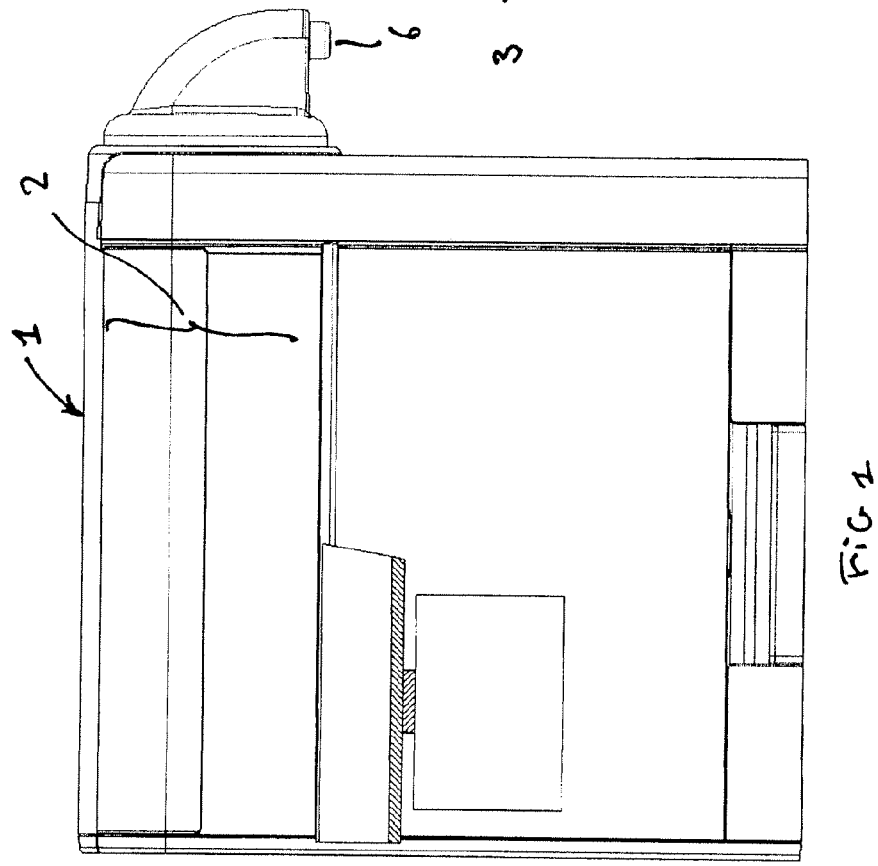

DRINK PREPARING MACHINE WITH HOLDING AND WARMING DEVICE

BACKGROUND

The present invention relates to drink preparing machines such as coffeemakers. It particularly relates to an improvement for prewarming cups to a certain controlled temperature.

Coffeemakers possessing a holder for supporting objects such as cups or other utensils (mugs, spoons, etc.) and prewarming them already exist. The main advantage, once the drink has been served by the machine, is that they reduce the heat exchange between the drink and the cup and therefore slow the rate of decrease of the temperature of the drink in the cup.

Existing machines usually use a cup holder linked to a warming device. One method is to use a simple heating resistor independent of the machine's main water-heating body. This method generates an increase in the power consumed by the machine and also necessitates a separate electric control. A second method is to at least partially warm the cup holder by using the heating body used to heat the water from which the drink is made. The two methods can also be used in combination.

However, adapting the heating body itself for the "cup-warming" function (e.g. a thermoblock or a boiler to heat the water) can create problems. One problem is that the heating body reaches very high temperatures of around 90-100° C. and therefore could cause burns in the event of contact with the cup warmer. Another problem is that the water which is passed through the heating body transmits vibrations from the water pump inside the machine (this may be a piston pump or any other component that generates vibrations). These vibrations may be transmitted to the holding plate in the event of direct contact and shake cups, drip trays or any other object placed on the machine (or even move them around), producing an annoying noise when the machine is in use. Thus, improvements in these type devices are desired.

SUMMARY OF THE INVENTION

The invention now overcomes these problems. For this purpose the invention relates to a machine for preparing drinks or beverages, especially hot drinks such as coffee, milk, hot chocolate or tea. This machine includes a holding and warming device that comprises at least one heating body and at least one holding part or plate for receiving at least one cup. The heating device is arranged to transmit the warming heat to the holding plate by conduction. Also, the heating body is connected to the fluid system of the machine. Such a system includes a pump for transporting the fluid around the machine. In accordance with one of the inventive principles, a heat-control and transmission means is in contact with the heating body This means also forms or is being connected to a damping means for reducing the vibrations transmitted by the pump to the heating body.

In such a machine, heating body is a heating means as described herein. The heat control means preferably is or is connected to damping means as disclosed herein so that the heating body or conductive heating means does not receive vibrations from the pump or fluid system.

The invention also relates to a method for warming a cup in a machine for preparing a hot drink or beverage, which comprises transmitting at least a part of surface heat generated by a heating body by conduction to a cup holder with the heating body also used to heat water in the machine. For this, at least on thermal control means may be interposed between the cup holder and heating body so that for a particular temperature of the heating body, the cup holder temperature is controlled to a lower value.

The invention also relates to a method for warming a cup in a machine for preparing a hot drink or beverage, which comprises transmitting some of surface heat generated by a heating body by conduction to a cup holder while at least partially damping vibrations transmissible by the heating body of the cup holder. For this, at least one vibration damping means my be interposed between the cup holder and heating body to dampen vibrations therebetween.

BRIEF DESCRIPTION OF THE DRAWING FIGURES

Certain embodiments will be detailed without implying any limitation with reference to the figures which follow:

FIG. 1 is a schematic view, partly in cross-section of a machine for preparing drinks according to the invention;

FIG. 2 is a schematic front view, partly in cross-section showing a detail from FIG. 1;

DETAILED DESCRIPTION OF THE PREFERRED EMBODIMENTS

Figure 3:
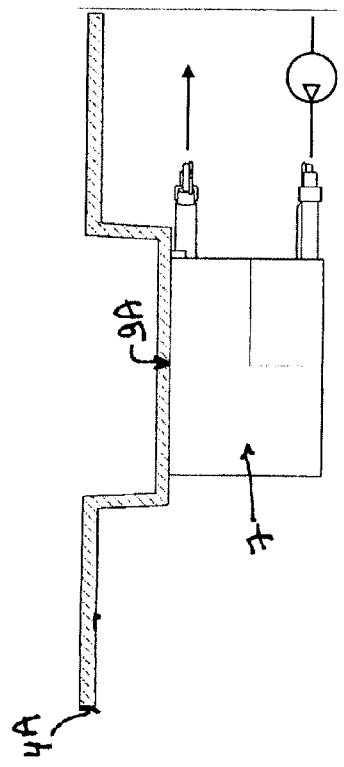
FIG. 3 is a detail view of a second embodiment.

The expressions "holding and warming device" or "cup warmer" are used without distinction in the description without being limited to cups in the strict sense, and other objects can be warmed by the device (such as mugs, containers of liquid or foam, spoons, etc.).

The phrase "heat-control means" is used to indicate any device or combination of devices for transmitting and controlling the transfer of heat from the heating body to the cup holder in such a way that the temperature of the cup holder reaches the level required for the desired application, e.g. avoiding the risk of burns when touching the cup holder and/or the cups themselves or in such a way to give the cup warmer and/or the cups themselves a temperature suitable for keeping the liquid at an ideal temperature for consumption.

The expression "damping means" is intended to denote any device or combination of devices capable of significantly reducing vibrations such as hydraulic or mechanical vibrations from the pump.

The heat-control means and the damping means may be directly connected or preferably be formed by one and the same means, so as to simplify the structure and keep costs down.

In a first possible embodiment, the heat-control means and the damping means are a single dual-function heat-control and damping means.

In this embodiment, the heat-control and damping means may be interposed in contact, on the one hand, with the heating body and in contact, on the other hand, with the cup-holding part. The heat-control and damping means is then formed from a material that is both heat-conducting and vibration-damping.

The heat-control and damping means is preferably an elastic or viscoelastic material. A preferred choice is an elastomeric or silicone material.

For example the heat-control and damping means may be at least one block or pad interposed between the heating body and the cup holder. The means possesses a total surface area of transfer of between 0.5 and 3 cm², preferably between 1 and 2 cm², and a thickness of between 0.1 and 2 cm. Naturally, the dimensions of the transfer surface area and thickness may be calculated or obtained by experimentation by a person skilled in the art without any great difficulty, to suit the materials and in particular the coefficients of heat transfer and of damping, of the contact surfaces and of the ranges of temperature of operation of the heating body and of the desired range of temperatures of the cup holder.

The cup-holding part may be made of plastic or metal. It will preferably be a metallic material such as aluminium or an aluminium alloy in order to transfer the temperature evenly across the whole of the surface of the support and thus ensure a constant temperature regardless of where the object is stood.

In one alternative, the heat-control and/or damping means is an integral part of the cup holder, since it is possible for the cup holder itself to be made of one or more damping materials such as a material having elastic or viscoelastic properties. In this version the holder can be made of, for example, a multi-layer comprising at least one heat-conducting layer to support the cups such as a metallic or hard plastic layer, and at least one underlayer of elastomer or silicone material. The underlayer may then be in direct contact with the heating body.

In another possible embodiment, the heat-control and/or damping means may be formed by a multitude of discrete contacts such as spikes or ribs with the heating body; at least some of the them being formed of an elastic or viscoelastic material. This will reduce the area of contact between the heating body so as to reduce the transfer of heat but also in order to damp the vibrations coming from the heating body.

In another embodiment, the heat-control means may be separate from the damping means, in the sense that they are independent means arranged either in series (e.g. in a multi-layer structure) or in parallel (e.g. side by side between the heating body and the cup holder).

For example, the heat-control means may be a heat insulator but not necessarily a damper. An example would be fibre, fabric, felt, cardboard treated to make it fire-resistant, or other heat-insulating materials. The damping means taken in isolation or in combination with the heat-control means may also be a hydraulic damper or a simple spring.

The invention also relates to a method for warming a so-called "cup-warming" device in a machine for preparing drinks, characterized in that it involves, among other things, transmitting by conduction a part only of the surface heat of the heating body to the cup holder of said device; which heating body also being used to heat the water in the machine. For this purpose the method involves interposing between the surface of the cup holder and the heating body at least one thermal control means.

The method involves interposing a thermal control means capable of maintaining the surface of the cup holder at a temperature of around 45 to 65° C., from a temperature of operation of the heating body which may be above 80° C.

Also, in combination with the above or independently thereof, the method involves damping all or some of the vibrations transmissible from the heating body to the cup holder. For this purpose the method involves interposing at least one vibration damping means between the surface of the cup holder and the heating body.

The method involves having the heat-control and damping means as either the same means or separate means. For this, at least one vibration damping means. As FIGS. 1 and 2 show in a first example, the machine according to the invention. This machine comprises a casing 1, a brewing module 2 in which the drink is brewed from an ingredient such as coffee, a water tank 3 and at least one cup holder 4 forming part of a "cup-warming" device described in detail later.

The brewing module may be designed to receive and brew, dissolve or dilute any ingredient contained in a package such as a closed capsule containing ground coffee or a plastic and/or aluminium sachet or sachet-filter or a simple filter. The module may also be designed to receive the ingredient directly without packaging and then to produce the drink. The module ends in an outlet 6 from where the drink is dispensed.

Figure 4:
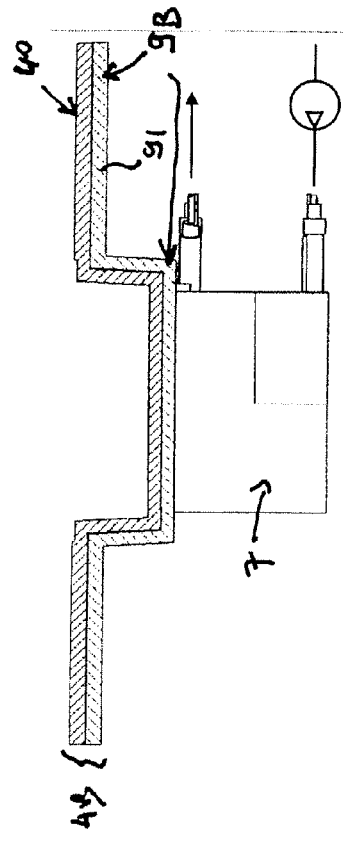
FIG. 4 is a detail view of a third embodiment.

The cup holder 4 may occupy a single plane or a single holding surface or occupy several levels or several surfaces as shown in FIGS. 3 and 4. It may be composed of several separate parts or parts connected together or be a single part such as a plate.

The water tank may be detachable. A direct connection to the water supply system may also be adopted.

The "cup-warming" device comprises a heating body 7 located inside the machine and possessing an external heating surface. The heating body may be a thermoblock, for example, for heating the water for preparing the drink inside the machine. The thermoblock typically comprises an internal water circuit (such as an internal coil made of copper or other alloy or other metals) which is mounted in a matrix heated by electrically insulated electrical resistors. The thermal inertia matrix may be aluminium or other alloy or a plastic. The matrix produces a large amount of surface heat which is therefore used as a heat source in the cup-warming device of the invention.

The water is introduced from the tank 3 into the heating body by means of a pump 8, preferably a piston pump. Notice that the invention is not necessarily limited to the use of a piston pump but extends to other possible pump types. The water is heated in the heating body 7 to a temperature appropriate for preparing the drink in the brewing module.

In accordance with one feature of the invention, the heating body 7 is placed in connection with the cup holder 4 via a heat-control and damping means 9 formed by a block or pad 90. This pad may be made of for example an elastic or viscoelastic material to attenuate vibrations transmitted by the heating body to the cup holder. Vibrations are transferred particularly by the fluid and/or pipes leading from the pump or by other possible modes of transmission such as by solid route between the heating body and other components of the machine. The block is also thick enough to control the temperature transmitted to the holding plate by the heating body. The heating body typically regularly reaches a maximum surface temperature of around 100° C. or 150° C. when preparing steam, whereas the desired temperature for the cup holder 4 may be around 45-65° C. The material and the dimensions are chosen to produce, under normal conditions of use of the machine, a loss of heat sufficient to raise and effectively control the temperature of the cup holder at about 45-65° C. For example, a silicone block with an insulating thickness of dimensions: diameter approximately 1.2 cm and thickness approximately 4 mm has given satisfactory results.

As to the cup holder 4, this may be made of a metallic material or a hard heat-resistant plastic. It is preferable to select a material that is a reasonably good heat conductor such as aluminium or an aluminium alloy for an even distribution of the temperature throughout the cup surface.

FIG. 3 shows another possible example in which the cup holder 4A is a single component and performs the function of the heat-control and damping means 9A on its own. The holder may be made of an elastomeric material, for example, in which case there is no need to interpose an extra part between the holder 4A and the heating body 7.

FIG. 4 shows another possible example in which the cup holder 4B comprises the heat-control and damping means 9B. In other words, the cup holder comprises at least one lower layer 91, or perhaps several layers performing the combined functions of heat control and damping. These layers may be made of elastomer or silicone for damping and may optionally provide at least some degree of heat control.

An additional, non-damping layer may be added to control or help to control or fine-tune the control of the heat transmitted to the holder layer 40 in contact with the cups.

Figure 5:
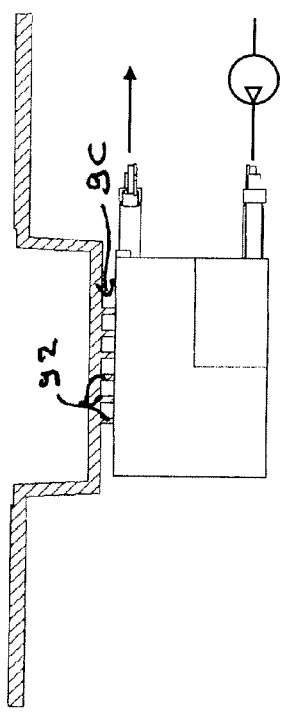
FIG. 5 is a detail view of a fourth embodiment.

FIG. 5 shows another possible example in which the cup holder also includes the heat-control and damping means 9C in the form of discrete components 92. These components may be spikes, points or ribs bearing on the heating surface of the heating body. Some of these components may be made of resilient or viscoelastic materials. The components could also be interposed between the holder 4C and the heating body 7. As an example they may take the form of one or more elastomeric rings.

Figure 6:
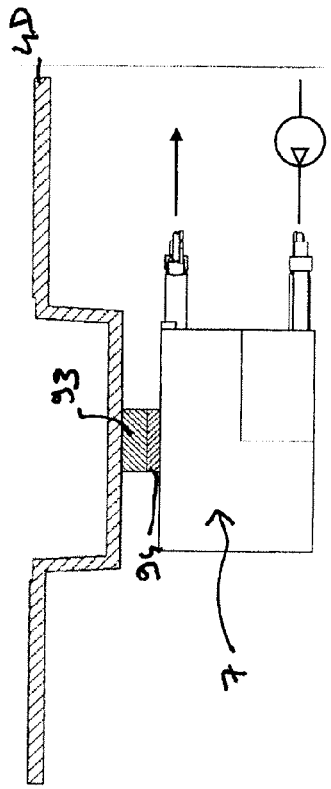
FIG. 6 is a detail view of a fifth embodiment.

FIG. 6 shows another possible form of separation of the heat-control and damping means. A damper 93 (e.g. a hydraulic damper or a layer of damping material) is placed between the holder 4D and the heating body 7. Another component 94 such as a thermal control material may be superimposed as shown or may be arranged in parallel.

Other embodiments are of course possible without departing from the scope of the invention may be interposed between the cup holder and heating body to dampen vibrations therebetween.

The invention claimed is:

1. A machine for preparing a hot drink or beverage comprising a cup-warming device that comprises a fluid delivery system that includes a pump for directing a fluid for beverage preparation in the machine; at least one conduction heating body; at least one cup-holding part for receiving at least one cup, with the heating body in fluid association with the pump and arranged to generate heat for transmission to the cup-holding part by conduction and also connected to the fluid delivery system; and a vibration damping member in contact with the heating body, with the vibration damping member comprising an elastic, elastomeric or viscoelastic material having a thickness that attenuates vibrations transmitted by the pump to the heating body from the fluid passing through the fluid delivery system, wherein the fluid is driven through the heating body via the pump and heated by the heating body for beverage preparation, the pump is located in the cup-warming device below the heating body, and the heating body is arranged with the vibration damping member so that the heat generated by the heating body is conducted to the cup-holding part through the vibration damping member, wherein the vibration damping member comprises an elastomeric or silicone material having a surface area of transfer of between 0.5 and 3 cm$^2$ and a thickness that is between 0.1 and 2 cm to control heat flow therethrough to allow the cup holding part to achieve a desired temperature.

2. The machine according to claim 1, wherein the vibration damping member is a block or pad interposed between and in contact with both the heating body and the cup-holding part.

3. The machine according to claim 1, wherein the cup-holding part is made of plastic or metal.

4. The machine according to claim 1, wherein the vibration damping member is formed as an underlayer of the cup-holding part itself.

5. A machine for preparing a hot drink or beverage comprising a cup-warming device that comprises a fluid delivery system that includes a pump for directing a fluid for beverage preparation in the machine; at least one conduction heating body; at least one cup-holding part for receiving at least one cup, with the heating body in fluid association with the pump and arranged to generate heat for transmission to the cup-holding part by conduction and also connected to the fluid delivery system; and a vibration damping member in contact with the heating body, with the vibration damping member comprising an elastic, elastomeric or viscoelastic material having a thickness that attenuates vibrations transmitted by the pump to the heating body from the fluid passing through the fluid delivery system, wherein the fluid is driven through the heating body via the pump and heated by the heating body for beverage preparation, the pump is located in the cup-warming device below the heating body, and the heating body is arranged with the vibration damping member so that the heat generated by the heating body is conducted to the cup-holding part through the vibration damping member, wherein the vibration damping member comprises an elastomeric or silicone material having a thickness that is between 0.1 and 2 cm and forms a multitude of discrete contacts in the form of spikes, rings or ribs to control heat flow therethrough to allow the cup holding part to achieve a desired temperature.

6. The machine according to claim 1, further comprising heat-control means as a separate component from the vibration damping member.

7. The machine according to claim 6, wherein the vibration damping member is a hydraulic damper.

8. The machine according to claim 6, wherein the heat-control means is a heat insulator in the form of a fiber, fabric, felt, cardboard material treated to be fire-resistant and having little or no resilience.

9. A method for warming a cup in a machine for preparing hot drink or beverage, which comprises providing a fluid delivery system that includes a pump for directing a fluid for beverage preparation in the machine; at least one conduction heating body in fluid association with the pump and arranged to generate heat for transmission to the cup-holding part by conduction and also connected to the fluid delivery system; and a vibration damping member in contact with the heating body, with the vibration damping member comprising an elastomeric or silicone material having a surface area of transfer of between 0.5 and 3 cm$^2$ and a thickness that is between 0.1 and 2 cm to attenuate vibrations transmitted by the pump to the heating body from the fluid passing through the fluid delivery system, wherein the fluid is driven through the heating body via the pump and heated by the heating body for beverage preparation, the pump is located in the cup-warming device beneath the heating body, and the heating body is arranged with the vibration damping member so that the heat generated by the heating body is conducted to the cup-holding part through the vibration damping member, wherein the thickness of the vibration damping member is also sufficient to control heat flow therethrough to allow the cup holding part to achieve a desired temperature.

10. The method of claim 9, which further comprises interposing at least one thermal control means between the cup holder and the heating body, wherein the heat control is a thermal control material superimposed on the vibration damping member or arranged in parallel thereto.

11. The method of claim 10, wherein the thermal control means maintains the cup holder surface at a temperature of between approximately 45 to 65° C. when the heating body reaches a contact temperature of between 100 and 120° C.

12. A machine for preparing a hot drink or beverage comprising a cup-warming device that comprises a fluid delivery system that includes a pump for directing a fluid for beverage preparation in the machine; at least one conduction heating body; at least one holding part for receiving at least one cup, with the heating body in fluid association with the pump and arranged to generate heat for transmission to the cup-holding part by conduction and also connected to the fluid delivery system; and the cup holding part comprising a vibration damping member in contact with the heating body, with the vibration damping member comprising an elastomeric or silicone material having a surface area of transfer of between 0.5 and 3 cm$^2$ and a thickness that is between 0.1 and 2 cm to attenuate vibrations transmitted by the pump to the heating body from the fluid passing through the fluid delivery system, wherein the fluid is driven through the heating body via the pump and heated by the heating body for beverage preparation, the pump is located in the cup-warming device beneath the heating body, and the heating body is arranged with the vibration damping member so that the heat generated by the heating body is conducted through the vibration damping member, wherein the thickness of the vibration damping member is also sufficient to control heat flow therethrough to allow the cup holding part to achieve a desired temperature.

13. The machine according to claim 12, wherein the cup holder further comprises metal or plastic portion for receiving cups thereon.

14. The machine according to claim 13, wherein the cup holder includes one or more additional layers including a non-damping layer to fine tune the control of the heat flow therethrough.

15. The machine according to claim 4, wherein the cup holder includes one or more additional layers including a non-damping layer to fine tune the control of the heat flow.

16. The machine according to claim 6, wherein the vibration damping member is a hydraulic damper or layer of damping material and the heat control is a thermal control material superimposed on the vibration damping member or arranged in parallel thereto.

* * * * *